United States Patent [19]
Suzuki et al.

[11] 3,915,922
[45] Oct. 28, 1975

[54] POLYVINYL CHLORIDE COMPOSITION

[75] Inventors: Kazuo Suzuki; Yoshiaki Hayashi; Kouzou Kobayashi, all of Otsu, Japan

[73] Assignee: Kanegafuchi Kaga ku Kogyo Kabushiki Kaisha, Japan

[22] Filed: Mar. 20, 1973

[21] Appl. No.: 343,111

[30] Foreign Application Priority Data
Mar. 25, 1972 Japan................................ 47-29907

[52] U.S. Cl........ 260/30.6 R; 106/288 B; 252/63.2; 260/31.8 R; 260/31.8 B; 260/42.14; 260/42.15
[51] Int. Cl.²... C08K 5/52; C08K 3/34; C08K 3/36
[58] Field of Search....... 260/42.14, 30.6 R, 31.8 R, 260/42.15; 106/288 B; 252/63.2

[56] References Cited
UNITED STATES PATENTS
3,622,364  11/1971  Sugahara et al................. 260/288 B
3,692,816  9/1972  della Faille..................... 260/46.5 R OTHER PUBLICATIONS
Sarvetnick, Harold A., Polyvinyl Chloride, Van Nostrand Reinhold Co., New York, 1969, pages 24, 25, 68, 69, & 122.

Primary Examiner—James H. Derrington
Attorney, Agent, or Firm—Armstrong, Nikaido & Wegner

[57] ABSTRACT

A polyvinyl chloride composition consisting of 100 parts by weight of vinyl chloride resins, 1 to 15 parts by weight of a finely divided silica having an average particle size of from 1 to 9 $\mu$ which is prepared by removing alumina component from montmorillonite type clay such as Japanese acid clay and bentonite through mineral acid and other additives. The vinyl chloride resins includes polyvinyl chloride, copolymer of vinyl chloride and $\alpha,\beta$-ethylenically unsaturated monomer and mixture of polyvinyl chloride and other resins being compatible with polyvinyl chloride. As a finely divided silica, there may be also preferably employed one having a hydrophobic property which is prepared by further treating the above silica with a treating agent of silane type selected from the group consisting of alkylalkoxysilane and vinylalkoxysilane. The composition can give an unplasticized or plasticized article having an excellent electric insulation.

10 Claims, No Drawings

POLYVINYL CHLORIDE COMPOSITION

BACKGROUND OF THE INVENTION

The present invention relates to a polyvinyl chloride composition, and more particularly to a polyvinyl chloride composition which can give an unplasticized or plasticized resinous article having a remarkably improved electric insulation.

It is common practice to incorporate an inorganic filler into a polyvinyl chloride composition to improve its electric insulation, and it has been generally known that a sintered clay is effective for improving the electric insulation of polyvinyl chloride composition. In that case, however, there is a limit in its effect and, it is difficult to make the electric insulation at high temperature raise.

Another proposal for plasticized article was to consider the balance between plasticizer and inorganic filler. However, the use of the specific plasticizer may cause trouble in other properties or may bring rise of cost. In case an amount of plasticizer employed is decreased or an amount of inorganic filler employed is increased to improve the electric insulation, the resistance to cold weather and the flexibility of the article obtained become poor.

Furthermore, for the purpose of the improvement of the electric insulation, it has been made a trial by the present inventors to incorporate a commercial silica as an inorganic filler in a polyvinyl chloride composition. However, according to the experiments of the present inventors it has been found that a commercial silica prepared from sodium silicate by the wet process has little effect on the improvement of electric insulation. Also, it has been found that a commercial silica prepared from silicon tetrachloride by the dry process brings lowering of mechanical properties, particularly lowering of elongation and makes the composition color to yellow though it has fairly effect of improving the electric insulation. Furthermore, in general, a polyvinyl chloride composition incorporating a commercial silica has disadvantages that the water resistance is inferior and the insulation resistance remarkably lowers with the lapse of time in case the composition is applied on an electric conductor.

OBJECT OF THE INVENTION

It is an object of the present invention to provide an improved polyvinyl chloride composition.

Further object of the invention is to provide a polyvinyl chloride composition which can give an unplasticized or plasticized resinous article having a remarkably improved electric insulation.

More further object of the invention is to eliminate the above-mentioned disadvantages of a conventional polyvinyl chloride composition for preparing an unplasticized or plasticized vinyl chloride-resinous article.

These and other objects of the present invention will become apparent from the description hereinafter.

DESCRIPTION OF THE INVENTION

It has been found that the above objects can be attained by incorporating the specific finely divided silica prepared by removing alumina component from montmorillonite type clay through mineral acid into vinyl chloride resins, and that the use of the finely divided silica having a hydrophobic property which is prepared by further treating the above silica with a treating agent of silane type selected from the group consisting of alkylalkoxysilane and vinylalkoxysilane can improve on their water-resistance.

The commercial silica includes impurities which prevent to improve the electric insulation, but the finely divided silica prepared from montmorillonite type clay in the present invention makes the electric insulation improve remarkably. Especially, the finely divided silica having a hydrophobic property prepared from montmorillonite type clay has an excellent effect of improving the electric insulation and the water resistance.

According to the present invention, an unplasticized or plasticized vinyl chloride-resinous article having an excellent electric insulation can be obtained. Preferred vinyl chloride resins employed are not only usual polyvinyl chloride but also include copolymers of vinyl chloride as a main component and monomers copolymerizable therewith, such as vinyl chloride-vinyl acetate copolymer, vinyl chloride-alkyl acrylate copolymer, i.e., vinyl chloride-methyl acrylate copolymer and vinyl chloride-ethyl acrylate copolymer, vinyl chloride-methyl methacrylate copolymer and vinyl chloride-vinyl alkyl ether copolymer, i.e., vinyl chloride-vinyl butyl ether copolymer. Furthermore, a mixture of polyvinyl chloride and other resins being compatible with polyvinyl chloride may be effectively employed according to the properties of desired resinous article. Examples of the resin being compatible with polyvinyl chloride are ethylene-vinyl acetate copolymer, vinyl chloride-grafted ethylene-vinyl acetate copolymer, methyl methacrylate-styrene-butadiene terpolymer, and the like.

In case of employing the vinyl chloride copolymer, it is preferable that the ratio of vinyl chloride unit is more than 50 % by mole. Also, in case of employing the mixture, the ratio of vinyl chloride unit in the mixture is preferably more than 50 % by mole.

The finely divided silica employed in the present invention to improve the electric insulation is prepared by substantially removing alumina component from montmorillonite type clay through mineral acid such as surfuric acid, hydrochloric acid or nitric acid.

Available montmorillonite type clay is Japanese acid clay and bentonite, and especially Japanese acid clay is preferably employed.

In preparing the finely divided silica, for instance, the montmorillonite type clay is treated with mineral acid, preferably 20 to 50 % by weight aqueous solution of sulfuric acid, at a temperature of 90° to 150°C. for about 12 to 24 hours with or without agitation, and then dried after water-washing.

Thus prepared finely divided silica does not include any impurities which prevent the improvement of the electric insulation, and then it can be effectively employed without unfavorably affecting the properties required by a composition for electric insulator such as resistance to cold weather, flexibility, other mechanical properties and no coloration of the composition. Furthermore, the water resistance can be improved by employing the finely divided silica having a hydrophobic property, which is prepared by treating the above-mentioned silica obtained from montmorillonite type clay with the treating agent of silane type such as alkylalkoxysilane and vinylalkoxysilane.

The average particle size of the finely divided silica employed in the present invention may be from 1 to 9 $\mu$.

The amount of the finely divided silica is suitably employed in the range from 1 to 15 parts by weight, preferably from 3 to 10 parts by weight, to 100 parts by weight of vinyl chloride resins employed. In case the amount employed is less than the above range, the effect of incorporating the finely divided silica can not be obtained. On the other hand, in case the amount employed is more than the above range, the electric insulation can not be improved as much as the amount employed, and also, in case of the plasticized article, the resistance to cold weather and the flexibility tend to become worse. The addition of the finely divided silica to the composition can be done at any course of the compounding. The finely divided silica also may be employed by previously dispersing it in plasticizer.

The finely divided silica having a hydrophobic property is prepared by dispersing the above-mentioned finely divided silica prepared from montmorillonite type clay into organic solvent and drying it after dropping the treating agent dissolved or dispersed in organic solvent or dispersing medium onto the finely divided silica while making it flow.

The treating agent of silane type employed in the present invention is that having the following general formula:

$$R_{1-n}Si(OR')_n$$

wherein R is methyl group, ethyl group or vinyl group, R' is methyl group or ethyl group, and $n$ is an integer from 1 to 3, inclusive. Examples of the treating agent having the above general formula are alkylalkoxysilane and vinylalkoxysilane, such as, for instance, dimethyldimethoxysilane, vinyltrimethoxysilane, and the like.

The treating agent is suitably employed in an amount of 0.3 to 5 % by weight to the finely divided silica to be treated. In case the amount of the treating agent is employed in much larger quantities than the above range, the electric insulation of the resinous article obtained tends to decrease. Examples of the solvent or the dispersing medium employed in the treatment of the silane are water, alcohol such as methanol or ethanol, acetone and other organic solvents. In drying the treated silica, it is desirable to take the temperature and period required to terminate the reaction between the finely divided silica and the treating agent at the same time of removing the solvent or the dispersing medium.

The plasticizer incorporated in the resin to prepare the plasticized article are preferably those having the electric insulation, such as di-2-ethylhexyl phthalate, diisodecyl phthalate, ditridecyl phthalate, tri-2-ethylhexyl trimellitate, tetra-2-ethylhexyl pyromellitate, tricresyl phosphate, and mixtures thereof.

The amount of the plasticizer may be from 20 to 100 parts by weight to 100 parts by weight of vinyl chloride resins. In case of employing the copolymer or the mixture, which has an internal plasticizing property, the addition of plasticizer may be excluded.

Also there are suitably employed the stabilizers being able to give the electric insulation such as tribasic lead sulfate, dibasic lead phosphite, dibasic lead phthalate, calcium stearate, stearic acid, and mixtures thereof.

Furthermore, other additives such as colorant, antioxidant and the like may be incorporated in the composition in accordance with necessity.

The polyvinyl chloride composition according to the present invention can give a resinous article having an improved electric insulation at moderate prices without substantially exerting a bad influence upon other properties.

The invention is more particularly described and explained by means of the following illustrative Examples, in which all parts and percentages are by weight except as noted.

EXAMPLES 1 TO 4

To 30 parts of Japanese acid clay containing about 20 % of alumina component was added 70 parts of 40 % aqueous solution of sulfuric acid. The treatment was carried out twice at a temperature of 100°C. for 12 hours with agitation, and then the treated Japanese acid clay was dried at a temperature of 105°C. for 6 hours after enough water-washing to give about 24 parts of a finely divided silica. The obtained finely divided silica contained about 0.5 % of alumina and had an average particle size of about 5 $\mu$.

To 100 parts of a standard composition consisting of 100 parts of polyvinyl chloride having a degree of polymerization of 2300, 50 parts of tri-2-ethylhexyl trimellitate, 5 parts of tribasic lead sulfate and 0.5 part of stearic acid was added 2 parts of the finely divided silica. The composition was milled by utilizing mixing rolls at a temperature of 180°C. for 7 minutes and then molded by press at a temperature of 170°C. for 7 minutes under pressure to prepare a sheet having a thickness of 1 mm. (Example 1).

The same procedure was repeated except that the finely divided silica was employed in an amount of 5 parts for Example 2, 10 parts for Example 3 and 15 parts for Example 4, respectively.

The volume resistivities of the sheets at 80°C. and 110°C. were measured, and also the elongation were measured at 23°C. according to the provision of JIS K 6723.

The results were shown in Table 1.

COMPARATIVE EXAMPLE 1

A plasticized polyvinyl chloride composition consisting of 100 parts of polyvinyl chloride having a degree of polymerization of 2300, 50 parts of tri-2-ethylhexyl trimellitate, 5 parts of tribasic lead sulfate and 0.5 part of stearic acid was milled by mixing rolls at a temperature of 180°C. for 7 minutes and then molded by press at a temperature of 170°C. for 7 minutes under pressure to prepare a sheet having a thickness of 1 mm. Then, the volume resistivities at 80°C. and 110°C. and the elongation were measured.

The results were shown in Table 1.

Table 1

| Example No. | Amount of the silica being incorporated Parts | Volume resistivity at 80°C. Ω-cm. | Volume resistivity at 110°C. Ω-cm. | Elongation % |
|---|---|---|---|---|
| 1 | 2 | $1.03 \times 10^{12}$ | $8.45 \times 10^{10}$ | 362 |
| 2 | 5 | $1.21 \times 10^{13}$ | $9.03 \times 10^{11}$ | 355 |
| 3 | 10 | $1.16 \times 10^{13}$ | $1.21 \times 10^{12}$ | 358 |
| 4 | 15 | $1.20 \times 10^{13}$ | $1.16 \times 10^{12}$ | 345 |
| Com. Ex. No. 1 | 0 | $6.40 \times 10^{11}$ | $5.73 \times 10^{10}$ | 371 |

As is clear from Table 1, the volume resistivity at high temperature of the invention is extremely large in comparison with the Comparative Example 1 in which an inorganic filler is not incorporated in the composition.

COMPARATIVE EXAMPLES 2 TO 4

The procedure of Example 1 was repeated except that, as an inorganic filler, 5 parts of sintered clay for Comparative Example 2, 5 parts of a commercial silica prepared from sodium silicate by the wet process for Comparative Example 3, or 5 parts of a commercial silica prepared from silicon tetrachloride by the dry process for Comparative Example 4 was incorporated into the standard composition in Example 1.

The results of volume resistivity and elongation were shown in Table 2.

Table 2

| Comparative Example No. | Volume resistivity | | Elongation |
|---|---|---|---|
| | at 80°C. | at 110°C. | |
| | Ω-cm. | Ω-cm. | % |
| 2 | $2.41 \times 10^{11}$ | $4.08 \times 10^{10}$ | 360 |
| 3 | $8.70 \times 10^{11}$ | $1.23 \times 10^{11}$ | 347 |
| 4 | $2.05 \times 10^{12}$ | $1.81 \times 10^{11}$ | 275 |

EXAMPLE 5

To 100 parts of a standard composition consisting of 100 parts of polyvinyl chloride having a degree of polymerization of 2300, 45 parts of tri-2-ethylhexyl trimellitate, 8 parts of dibasic lead phthalate and 0.5 part of stearic acid was added 5 parts of a finely divided silica prepared by substantially removing alumina component from Japanese acid clay through sulfuric acid, of which alumina content was about 1.5 % and an average particle size was about 4 μ.

A sheet having a thickness of 1 mm. was prepared by the same manner as in Example 1, and then the volume resistivities at 30°C. and 110°C. and the water resistance were measured.

The results were $9.30 \times 10^{14}$ Ω-cm., $3.97 \times 10^{11}$ Ω-cm. and 29.4 %, respectively.

According to the provision of JIS K 6723, the water resistance was measured by the following manner.

At first, the volume resistivity at 30°C. was measured (the value was referred to as A), and the same sheet employed in measurement was dipped in water maintained at 80°C. for 72 hours. Then, the volume resistivity of the sheet was measured again at 30°C. (the value was referred to as B). The water resistance was calculated according to the following equation.

$$\text{Water resistance} = \frac{B}{A} \times 100$$

COMPARATIVE EXAMPLE 5

The procedure of Example 5 was repeated except that 5 parts of sintered clay as an inorganic filler was employed instead of the finely divided silica.

The volume resistivities at 30°C. and 110°C. were $6.27 \times 10^{14}$ Ω-cm. and $5.06 \times 10^{10}$ Ω-cm., respectively.

EXAMPLE 6

A 500 ml. two neck flask provided with a stirrer was charged with 180 ml. of water and then 20 g. of a finely divided silica prepared from Japanese acid clay, of which average particle size was about 5 μ.

The aqueous dispersion prepared by dispersing 1 g. of dimethyldimethoxysilane in 20 ml. of water was added dropwise to the flask with agitation. After successively agitating the contents at a room temperature for 30 minutes, the contents were filtered and dried at 100°C. for 4 hours to give the finely divided silica having a hydrophobic property.

To 100 parts of a composition consisting of 100 parts of polyvinyl chloride having a degree of polymerization of 2300, 45 parts of tri-2-ethylhexyl trimellitate, 8 parts of tribasic lead sulfate and 0.5 part of stearic acid was added 5 parts of the finely divided silica having a hydrophobic property.

A sheet having a thickness of 1 mm. was prepared by the same manner as in Example 1, and then the volume resistivities at 30°C. and 110°C. and the water resistance were measured.

The results were $9.43 \times 10^{14}$ Ω-cm., $4.01 \times 10^{11}$ Ω-cm. and 46.4 %, respectively.

Compared with the composition of Example 5 employing the finely divided silica not treated with silane, which showed the water resistance of 29.4 %, the composition employing the finely divided silica having a hydrophobic property showed more excellent water resistance.

COMPARATIVE EXAMPLE 6

To 100 parts of the same composition as in Example 6 was added 5 parts of sintered clay as an inorganic filler. A sheet having a thickness of 1 mm. was prepared by the same manner as in Example 1, and then the volume resistivities at 30°C. and 110°C. and the water resistance were measured.

The results were $3.22 \times 10^{14}$ Ω-cm., $3.47 \times 10^{10}$ Ω-cm. and 40.7 %, respectively.

EXAMPLES 7 TO 11

A 9 liter Henshel mixer was charged with 800 g. of a finely divided silica prepared from Japanese acid clay, of which average particle size is about 5 μ, and it was agitated at 3000 r.p.m.

Dimethyldimethoxysilane oof 0.1 % to silica, which was dispersed in 120 ml. of water, was added dropwise to the mixer. After successively agitating the contents of 5 minutes, the contents were taken out and dried in air at 100°C. for 4 hours to obtain a finely divided silica having a hydrophobic property.

To 100 parts of the same composition as in Example 6 was added 5 parts of the finely divided silica having a hydrophobic property.

A sheet having a thickness of 1 mm. was prepared by the same manner as in Example 1, and then the volume resistivities at 30°C. and 110°C. and the water resistance were measured.

The procedure of the above was repeated except that dimethyldimethoxysilane was added in the ratio of 0.3 % for Example 8, 0.5 % for Example 9, 1 % for Example 10 and 5 % for Example 11, to silica.

The results were shown in Table 3.

Table 3

| Example No. | Volume resistivity | | Water resistance |
|---|---|---|---|
| | at 30°C. | at 110°C. | |
| | Ω-cm. | Ω-cm. | % |
| 7 | $2.12 \times 10^{15}$ | $6.42 \times 10^{11}$ | 30.5 |
| 8 | $1.37 \times 10^{15}$ | $6.45 \times 10^{11}$ | 69.3 |
| 9 | $1.57 \times 10^{15}$ | $6.11 \times 10^{11}$ | 69.1 |
| 10 | $1.78 \times 10^{15}$ | $5.25 \times 10^{11}$ | 65.7 |

Table 3-continued

| Example No. | Volume resistivity | | Water resistance |
|---|---|---|---|
| | at 30°C. Ω-cm. | at 110°C. Ω-cm. | % |
| 11 | $1.63 \times 10^{15}$ | $1.93 \times 10^{11}$ | 67.7 |

EXAMPLE 12

A 500 ml. two neck flask provided with stirrer was charged with 180 ml. of water and 20 g. of a finely divided silica prepared from Japanese acid clay, of which average particle size was about 5 μ.

The aqueous dispersion prepared by dispersing 0.1 g. of vinyltrimethoxysilane in 20 ml. of water was added dropwise to the flask with agitation. After successively agitating the contents at a room temperature for 30 minutes, the contents were filtered and dried at 100°C. for 4 hours to give the finely divided silica having a hydrophobic property.

To 100 parts of the same standard composition as in Example 6 was added 5 parts of the finely divided silica as an inorganic filler. A sheet having a thickness of 1 mm. was prepared by the same manner as in Example 1, and then the volume resistivities at 30°C. and 110°C. and the water resistance were measured.

The results were $6.74 \times 10^{14}$ Ω-cm., $5.20 \times 10^{11}$ Ω-cm. and 60.6 %, respectively.

EXAMPLE 13

A 500 ml. two neck flask provided with stirrer was charged with 180 ml. of benzene and 20 g. of a finely divided silica prepared from Japanese acid clay, of which average particle size was about 5 μ.

The solution prepared by dissolving 1 g. of dimethyldimethoxysilane in 20 ml. of benzene was added dropwise to the flask with agitation. After suuccessively agitating the contents at a room temperature for 30 minutes, the contents were filtered and dried in air at 100°C. for 4 hours to give the finely divided silica having a hydrophobic property.

To 100 parts of the same standard composition as in Example 6 was added 5 parts of the finely divided silica as an inorganic filler. A sheet having a thickness of 1 mm. was prepared by the same manner as in Example 1, and then the volume resistivities at 30°C. and 110°C. and the water resistance were measured.

The results were $8.06 \times 10^{14}$ Ω-cm., $3.18 \times 10^{11}$ Ω-cm. and 55.3 %, respectively.

EXAMPLE 14

To 100 parts of a composition consisting of 100 parts of polyvinyl chloride having a degree of polymerization of 2300, 10 parts of ethylene-vinyl acetate copolymer (trade name: SOAREX-BH made by THE NIPPON SYNTHETIC CHEMICAL INDUSTRIES CO., LTD.), 35 parts of tri-2-ethylhexyl trimellitate, 8 parts of dibasic lead phthalate and 0.5 part of stearic acid was added 5 parts of the finely divided silica having a hydrophobic property obtained in Example 6.

A sheet having a thickness of 1 mm. was prepared by the same manner as Example 1, and then the volume resistivity at 110°C. was measured.

The result was $2.30 \times 10^{11}$ Ω-cm.

EXAMPLE 15

To 100 parts of a composition consisting of 100 parts of polyvinyl chloride having a degree of polymerization of 3000, 10 parts of vinyl chloridegrafted ethylene-vinyl acetate copolymer (trade name: SUMIGRAFT GF made by SUMITOMO CHEMICAL CO., LTD.), 35 parts of tri-2-methylhexyl trimellitate, 3 parts of dibasic lead phthalate and 0.5 part of stearic acid was added 5 parts of the finely divided silica obtained in Example 6.

A sheet having a thickness of 1 mm. was prepared by the same manner as in Example 1, and then the volume resistivity was measured.

The result was $7.40 \times 10^{11}$ Ω-cm.

EXAMPLE 16

To 100 parts of a composition consisting of 100 parts of vinyl chloride-vinyl acetate copolymer (vinyl chloride : vinyl acetate = 97 : 3 by molar ratio), 50 parts of tri-2-ethylhexyl trimellitate, 5 parts of tribasic lead sulfate and 0.5 part of stearic acid was added 5 parts of the finely divided silica having a hydrophobic property obtained in Example 6.

A sheet having a thickness of 1 mm. was prepared by the same manner as in Example 1, and then the volume resistivity at 110°C. was measured.

The result was $3.50 \times 10^{11}$ Ω-cm.

EXAMPLE 17

The procedure of Example 1 was repeated except that 5 parts of a finely divided silica prepared from bentonite was employed instead of the finely divided silica in Example 1.

The obtained sheet had an excellent electric insulation.

EXAMPLE 18

To 100 parts of a composition consisting of 100 parts of polyvinyl chloride havaing a degree of polymerization of 800, 3 parts of tribasic lead sulfate and 1 part of dibasic lead stearate was added 5 parts of the finely divided silica in Example 1.

A sheet having a thickness of 1 mm. was prepared by the same manner as in Example 1, and then the volume resistivity at 30°C. was measured.

The result was $1.20 \times 10^{17}$ Ω-cm.

What we claim is:

1. A polyvinyl chloride composition having improved electrical insulating proportions comprising 100 parts by weight of a vinyl chloride resin and 1 to 15 parts by weight of a filler consisting essentially of finely divided silica having an average particle size of from 1 to 9 μ which is prepared by substantially removing alumina component from Japanese acid clay through a mineral acid selected from the group consisting of sulfuric acid, hydrochloric acid and nitric acid.

2. The polyvinyl chloride composition of claim 1, wherein said finely divided silica is one treated with a treating agent of silane type having the following general formula:

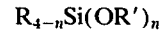

$$R_{4-n}Si(OR')_n$$

wherein R is methyl group, ethyl group or vinyl group, R' is methyl group or ethyl group, and n is an integer of from 1 to 3, inclusive, in an amount of 0.3 to 5 % by weight to the silica to be treated.

3. The polyvinyl chloride composition of claim 1, wherein said finely divided silica is employed in an amount of from 3 to 10 parts by weight to 100 parts by weight of a vinyl chloride resin.

4. The polyvinyl chloride composition of claim 2, wherein said finely divided silica is employed in an amount of from 3 to 10 parts by weight to 100 parts by weight of a vinyl chloride resin.

5. The polyvinyl chloride composition of claim 1, in which at least one plasticizer selected from the group consisting of di-2-ethylhexyl phthalate, diisodecyl phthalate, ditridecyl phthalate, tri-2-ethylhexyl trimellitate, tetra-2-ethylhexyl pyromellitate and tricresyl phosphate is further added in an amount of 20 to 100 parts by weight to 100 parts by weight of a vinyl chloride resin.

6. The polyvinyl chloride composition of claim 1, wherein said vinyl chloride resin is polyvinyl chloride.

7. The polyvinyl chloride composition of claim 1, wherein said vinyl chloride resin is a copolymer of vinyl chloride and one member selected from the group consisting of vinyl acetate, methyl acrylate, ethyl acrylate, methyl methacrylate and vinyl butyl ether; the ratio of vinyl chloride unit in the copolymer being more than 50 % by mole.

8. The polyvinyl chloride composition of claim 1, wherein said vinyl chloride resin is a mixture of polyvinyl chloride and at least one member selected from the group consisting of ethylene-vinyl acetate copolymer, vinyl chloride-grafted ethylene-vinyl acetate copolymer and methyl methacrylate-styrene-butadiene terpolymer; the ratio of vinyl chloride unit in the mixture being more that 50 % by mole.

9. A plasticized polyvinyl chloride composition comprising 100 parts by weight of polyvinyl chloride, 5 to 10 parts by weight of a finely divided silica having an average particle size of from 1 to 9 $\mu$ which is prepared by substantially removing alumina component from Japanese acid clay through sulfuric acid and 40 to 55 parts by weight of at least one plasticizer selected from the group consisting of di-2-ethylhexyl phthalate, diisodecyl phthalate, ditridecyl phthalate, tri-2-ethylhexyl trimellitate, tetra-2-ethylhexyl pyromellitate and tricresyl phosphate.

10. The plasticized polyvinyl chloride composition of claim 9, wherein said finely divided silica is one treated with a treating agent of silane type having the following general formula:

$$R_{4-n}Si(OR')_n$$

wherein R is methyl group, ethyl group or vinyl group, R' is methyl group or ethyl group, and $n$ is an integer of from 1 to 3, inclusive, in an amount of 0.3 to 5 % by weight to the silica to be treated.

* * * * *